(12) United States Patent
Shudo

(10) Patent No.: US 8,316,076 B2
(45) Date of Patent: *Nov. 20, 2012

(54) IMAGE PROCESSING APPARATUS, PROGRAM PRODUCT AND MANAGEMENT SERVER EXECUTING PRESCRIBED PROCESS TO A TRANSMITTED IMAGE

(75) Inventor: Takao Shudo, Kobe (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 45 days.

This patent is subject to a terminal disclaimer.

(21) Appl. No.: 12/834,400

(22) Filed: Jul. 12, 2010

(65) Prior Publication Data

US 2010/0281098 A1    Nov. 4, 2010

Related U.S. Application Data

(62) Division of application No. 10/724,137, filed on Dec. 1, 2003, now Pat. No. 7,769,801.

(30) Foreign Application Priority Data

Sep. 1, 2003 (JP) ............................... 2003-308724

(51) Int. Cl.
*G06F 15/16* (2006.01)
*H04N 1/00* (2006.01)
(52) U.S. Cl. ....................................... 709/201; 358/402
(58) Field of Classification Search ................... 726/16; 358/E5.103, 402, 1.15; 709/201
See application file for complete search history.

(56) References Cited

U.S. PATENT DOCUMENTS

| 6,504,627 B1 * | 1/2003 | Matsumoto ................... 358/448 |
| 6,839,755 B1 | 1/2005 | Kumpf et al. |
| 2002/0041386 A1 * | 4/2002 | Suzuki et al. ................ 358/1.13 |
| 2002/0156879 A1 | 10/2002 | Delany et al. |
| 2003/0043416 A1 | 3/2003 | Rublee et al. |
| 2003/0072031 A1 | 4/2003 | Kuwata et al. |
| 2004/0003095 A1 | 1/2004 | Gitany-Alonso |

(Continued)

FOREIGN PATENT DOCUMENTS

JP    9-214718    8/1997

(Continued)

OTHER PUBLICATIONS

Japanese Office Action mailed Nov. 11, 2005, directed to JP Application No. 2003-308724.

(Continued)

*Primary Examiner* — Chirag R Patel
(74) *Attorney, Agent, or Firm* — Morrison & Foerster LLP

(57) ABSTRACT

In order to cause a management server to execute a process desired by a user and to be shared by a plurality of users, an image processing apparatus capable of communicating with the management server includes a scanner inputting image data, an authentication information input unit inputting information necessary for authenticating a user, an authentication information send unit for transmitting the input authentication information to the management server, an additional function list receiver receiving from the management server, in response to the transmission of the authentication information, an additional function list for specifying an additional function registered in association with the user among the additional functions executed by the management server, an additional function selector accepting designation of the additional function, and an additional function select information transmitter transmitting the specified additional function and the input image data to the management server.

17 Claims, 7 Drawing Sheets

U.S. PATENT DOCUMENTS

2004/0120009 A1    6/2004    White et al.

FOREIGN PATENT DOCUMENTS

| JP | 10-111793 | 4/1998 |
| JP | 2000-194627 | 7/2000 |
| JP | 2003-229978 | 8/2003 |

OTHER PUBLICATIONS

Shudo, U.S. Office Action mailed Oct. 1, 2007, directed to U.S. Appl. No. 10/724,137; 13 pages.

Shudo, U.S. Office Action mailed Apr. 4, 2008, directed to U.S. Appl. No. 10/724,137; 12 pages.

Shudo, U.S. Office Action mailed Feb. 24, 2009, directed to U.S. Appl. No. 10/724,137; 13 pages.

Shudo, U.S. Office Action mailed Aug. 18, 2009, directed to U.S. Appl. No. 10/724,137; 13 pages.

\* cited by examiner

F I G. 4

| ADDITIONAL FUNCTION NUMBER | USER ID | TITLE | APPLICATION PROGRAM | PARAMETER |
|---|---|---|---|---|
| 1 | 001 | TRANSMIT MAIL TO MR. A | E-MAIL PROGRAM | MAIL ADDRESS OF MR. A |
| 2 | 001 | TRANSMIT MAIL TO MR. B | E-MAIL PROGRAM | MAIL ADDRESS OF MR. B |
| 3 | 001 | NOISE ELIMINATION | SMOOTHING PROGRAM | — |
| 4 | 002 | FILE TRANSMISSION TO COMPUTER 4 | FILE TRANSFER PROGRAM | INFORMATION OF TRANSMISSION PARTY (IP ADDRESS, DIRECTORY) |
| 5 | 002 | TILT CORRECTION | TILT CORRECTION PROGRAM | — |

ADDITIONAL FUNCTION LIST OF USER 001

| ADDITIONAL FUNCTION NUMBER | TITLE |
|---|---|
| 1 | TRANSMIT MAIL TO MR. A |
| 2 | TRANSMIT MAIL TO MR. B |
| 3 | NOISE ELIMINATION |

IMAGE PROCESSING APPARATUS, PROGRAM PRODUCT AND MANAGEMENT SERVER EXECUTING PRESCRIBED PROCESS TO A TRANSMITTED IMAGE

CROSS-REFERENCE TO RELATED APPLICATIONS

This application is a divisional application of U.S. Ser. No. 10/724,137, filed on Dec. 1, 2003, which is based on Japanese Patent Application No. 2003-308724, filed with the Japan Patent Office on Sep. 1, 2003, the entire contents of which are hereby incorporated by reference.

BACKGROUND OF THE INVENTION

1. Field of the Invention

The present invention relates to an image processing apparatus, a management server, an image processing program product, and an information processing program product, and specifically, to an image processing apparatus in which process to be executed to an image is limited, an image processing program product executed thereby, a management server executing a prescribed process to an image transmitted from the image processing apparatus, and an information processing program product executed thereby.

2. Description of the Related Art

Conventionally, it has been necessary to specify a transmission party when transmitting a document or the like using a transmission line. A technique for facilitating the specification of the transmission party is disclosed in Japanese Laid-Open Patent Publication No. 9-214718. Japanese Laid-Open Patent Publication No. 9-214718 discloses a document transmitting apparatus characterized by including: a transmission party information store unit storing per person transmission party information necessary for transmission such as a telephone number, a facsimile number, a mail ID and the like for each of a plurality of transmission parties such as home or an office; a determine unit determining, when transmitting a prepared document, if it is a personal document or of a business document; and an output unit outputting transmission party information of the transmission address of personal or of business that corresponds to the transmission party. According to the document transmitting apparatus, by selecting whether the document to be transmitted is a personal document or a business document, and storing the selection in association with the document, either of the personal or the business transmission addresses that corresponds to the transmission party can be output from the transmission party information store unit to the output unit.

However, with the document transmission apparatus disclosed in Japanese Laid-Open Patent Publication No. 9-214718, a plurality of users must share transmission parties in the transmission party information store unit. Accordingly, for one of the users, transmission parties related to other users may be output and the user must select the right transmission party among the transmission parties. Additionally, though it is possible to prevent transmission parties related to other users from being output if the transmission parties only related to a specific user is stored in the transmission party information store unit, but then the document transmission apparatus may only be available to that specific user. Therefore, when several persons desire to use the document transmission apparatus, then the document transmission apparatus must be provided as many the persons are.

SUMMARY OF THE INVENTION

The present invention is made to solve the problems above, and one object of the present invention is to provide an image processing apparatus that causes a management server to execute a process desired by a user, and can be shared by a plurality of users.

Another object of the present invention is to provide a management server capable of executing each process desired by a plurality of the users of an image processing apparatus.

Still another object of the present invention is to provide an image processing program product that causes a management server to execute a process desired by a user, and enabling a plurality of users to share the image processing apparatus.

Still another object of the present invention is to provide an information processing program product capable of causing a management server to execute each process desired by a plurality of users of an image processing apparatus.

In order to achieve the objects above, according to one aspect of the present invention, an image processing apparatus capable of communicating with a management server includes: an image data input unit inputting image data; an authentication information input unit inputting authentication information necessary for authenticating a user; an authentication information transmitter transmitting the input authentication information to the management server; a process content information receiver receiving from the management server, in response to the transmission of the authentication information, process content information for specifying a process content that is registered in association with the user among process contents executed by the management server; a specification accept unit accepting specification of the received process content information; and an instruction transmitter transmitting the specified process content information and the input image data to the management server.

According to the present invention, the authentication information necessary for authenticating a user is transmitted to the management server, and in response to the transmission of the authentication information, the process content information for specifying the process content that is registered in association with the user among the process contents executed by the management server is received from the management server. Accordingly, process content information for specifying a process content registered in association with other user will not be received. Additionally, when the specification of the received process content information is accepted, the specified process content information and image data are transmitted to the management server. Thus, in special when the image processing apparatus is shared by a plurality of users, each of the users can easily select the process content of his/her frequent use, and therefore the operability thereof increases. As a result, the image processing apparatus that can cause the management server to execute the process desired by a user and that can be shared by a plurality of users can be provided.

According to another aspect of the present invention, a management server capable of communicating with an image processing apparatus includes: a process content table store unit storing a process content table associating identification information for identifying a user with a process content; an authentication information receiver receiving authentication information necessary for authenticating the user from the image processing apparatus; an authentication unit determining if the received authentication information is true or not; a process content information transmitter extracting, when the received authentication information is determined to be true by the authentication unit, a process content stored in the process content table in association with identification information included in the authentication information, and transmitting process content information for specifying the extracted process content to the image processing apparatus; and a processing execute unit executing, when receiving image data and the process content information from the image processing apparatus in response to the transmission of the process content information, a process to the received image data in accordance with the process content specified by the received process content information.

According to the present invention, when the information necessary for authenticating the user is received from the image processing apparatus, and the received authentication information is determined to be true, then the process content stored in association with the identification information included in authentication information, and the process content information for specifying the extracted process content is transmitted to the image processing apparatus. Then, when the image data and the process content information are received in response to the transmission of the process content information, a process is executed to the received image data according to the process content specified by the received process content information. Thus, the management server capable of executing each process desired by a plurality of users of the image processing apparatus can be provided.

According to still another aspect of the present invention, an image processing program product executed by an image processing apparatus capable of communicating with a management server causes the image processing apparatus the steps of: inputting image data; inputting authentication information necessary for authenticating a user; transmitting the input authentication information to the management server; receiving from the management server, in response to the transmission of the authentication information, process content information for specifying a process content registered in association with the user among process contents executed by the management server; accepting the specification of the received process content information; and transmitting the specified process content information and the input image data to the management server.

According to the present invention, an image processing program product that causes the management server the process desired by the user and enabling a plurality of users to share the image processing apparatus can be provided.

According to still another aspect of the present invention, an information processing program product executed by a management server capable of communicating with an image processing apparatus and including a process content table store unit storing a process content table associating identification information for identifying a user with a process content, causing the management server to execute the steps of: receiving authentication information necessary for authenticating the user; determining if the received authentication information is true or not; when the received authentication information is determined to be true, extracting a process content stored in the process content table in association with identification information included in the authentication information and transmitting process content information for specifying the extracted process content to the image processing apparatus; and when image data and the process content information are received from the image processing apparatus in response to the transmission of the process content information, executing a process to the received image data in accordance with a process content specified by the received process content information.

According to the present invention, the information processing program product capable of causing the management server to execute each process desired by a plurality of users of the image processing apparatus can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows an exemplary additional function per user table.

DETAILED DESCRIPTION OF THE INVENTION

Figure 1:
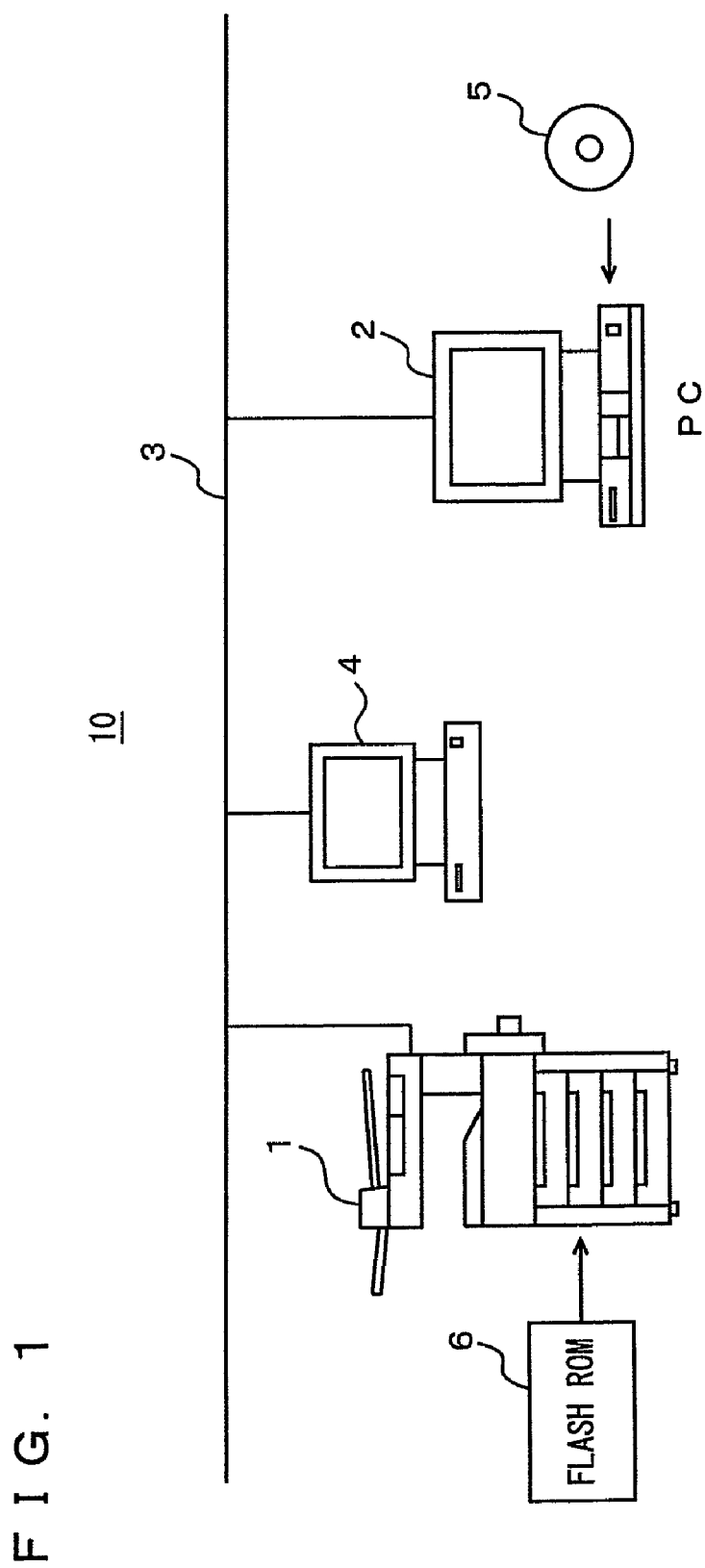
FIG. 1 is an overall schematic view of a print system according to one embodiment of the present invention.

In the following, embodiments of the present invention will be described referring to the figures. Throughout the description, similar parts are given the same reference character. Names and functions thereof are the same as well. Accordingly, detailed description thereof will not be repeated.

FIG. 1 shows an overall schematic view of a print system according to one embodiment of the present invention. Referring to FIG. 1, print system 10 includes a multi function peripheral 1 (hereinafter referred to as MFP 1) and a management server 2 each connected to a network 3. To network 3, a user computer 4 is also connected. User computer 4 is a general personal computer. Though the figure shows the example where one MFP 1 and one management server 2 are connected, a plurality of MFP 1 and a plurality of management servers 2 may be connected to network 3.

MFP 1 is an image processing apparatus, and includes a scanner for reading a document, an image formation apparatus for forming an image on a recording medium such as a paper based on image data, and a facsimile, and having an image reading function, a copying function, a facsimile transmitting/receiving function, and a printing function for printing data. MFP 1 receives image data from user computer 4, management server 2 or the scanner, and outputs it from the image formation apparatus. Additionally, a detachable flash ROM 6 is attached to MFP 6. An image processing program stored in flash ROM 6 is executed by central processing unit (CPU) contained in MFP 1. It is noted that the image processing program may not be read from flash ROM 6, and alternatively, it may be stored in EEPROM (electrically erasable/programmable read only memory). MFP 1 executes the program stored in EEPROM by CPU. Further, as EEPROM is capable of rewriting or adding to the storage content, other computer connected to network 3 may rewrite the image processing program stored in EEPROM of MFP 1 or may add a new image processing program thereto. Still further, MFP 1 may download an image processing program from other computer connected to network 3 to store it in EEPROM.

Management server 2 is a general personal computer. The hardware configuration thereof is well known, and therefore the description thereof is not repeated herein. To management server 2, a CD-ROM (Compact Disc Read Only Memory) 5 is attached. A management program recorded in CD-ROM 5 is read by CD-ROM drive or the like to be temporally stored in hard disc. It is further read from the hard disc to a random access memory (RAM) and executed by CPU.

Further, management server 2 reads application programs such as an e-mail transmission program, a file transfer program, a file management program, and an image processing program to RAM as necessary to be executed by CPU.

Network 3 is a local area network (LAN), the interne or a public telephone network, and it may be wired or wireless. Though the example has been described where MFP 1 and management server 2 are connected through network 3, they may be connected using a serial line or a parallel line.

Though the example has been described where the image processing program to be executed by MFP 1 is distributed as stored in flash ROM, while the management program to be executed by management server 2 is distributed as stored in CD-ROM, they may be stored in other recording medium, for example, a medium fixedly storing the programs, such as a flexible disc, a cassette tape, a CD-ROM, hard disc, an optical disc (MO (Magnetic Optical Disc)/MD (Mini Disc)/DVD (Digital Versatile Disc)), IC card (including a memory card), an optical card, a semiconductor memory such as a mask ROM, an EPROM, an EEPROM, and a flash ROM.

Further, the image processing program or the management program may be provided not through a recording medium but through network 3.

Still further, the program as used herein is a concept including not only a program that is directly executable by CPU but also a program of a source program format, a compressed program, an encrypted program and the like.

In print system 10 according to the present embodiment, the operation of MFP 1 by a user causes management server 2 to execute a prescribed process. Here, the prescribed process executed by management server 2 is specifically referred to as an additional function. As the additional functions executed by management server 2, the following processes can be found. It is noted that such a process is merely an example, and the additional function is not limited thereto as long as it is a process that handles image data and executable by a computer. Preferably, it is a process not executed by MFP 1. Though in the present embodiment the example will be described where a single MFP 1 is employed, a plurality of MFPs 1 may correspond to a single management server 2. In this case, the processes may differ among different MFPs. Accordingly, the additional function executed by management server 2 may include the process that is executed by MFP 1.

1) Transmission Process

It is a process of transmitting image data received from MFP 1 to other computer through network 3. The transmission includes transmission according to an e-mail protocol, transmission according to a file transfer protocol and the like. Transmission according to other protocol may be included, if it allows transmission to other computer.

2) Image Process

A prescribed image process is executed to image data received from MFP 1. The image process includes, for example, a tilt correction process for correcting the tilt of the image, a noise elimination process for removing an isolated point from the image, a smoothing process, a color matching process, a direction correction process for determining the direction of the image and rotating it for correction and the like. Other process may be included, if it is a process of performing correction, change or the like to the image data.

3) File Management Process

It is a process of recording image data received from MFP 1 in a recording medium such as hard disc or the like. There may be various methods as a recording method. When a file management program, for example, is installed in management server 2, the image data is registered in a database that is generated by the execution of the file management program. Alternatively, it may simply be recorded in a prescribed storage location such as a folder allocated for each user.

The image data input to MFP 1 is image data obtained by reading a document with the scanner, image data created by or stored in user computer 4 and transmitted to MFP 1 through network 3, and data received by a facsimile. The image data received from user computer 4 includes, for example, print data generated by the execution of a document preparation program, a spreadsheet program, a paint program and the like.

Figure 2:
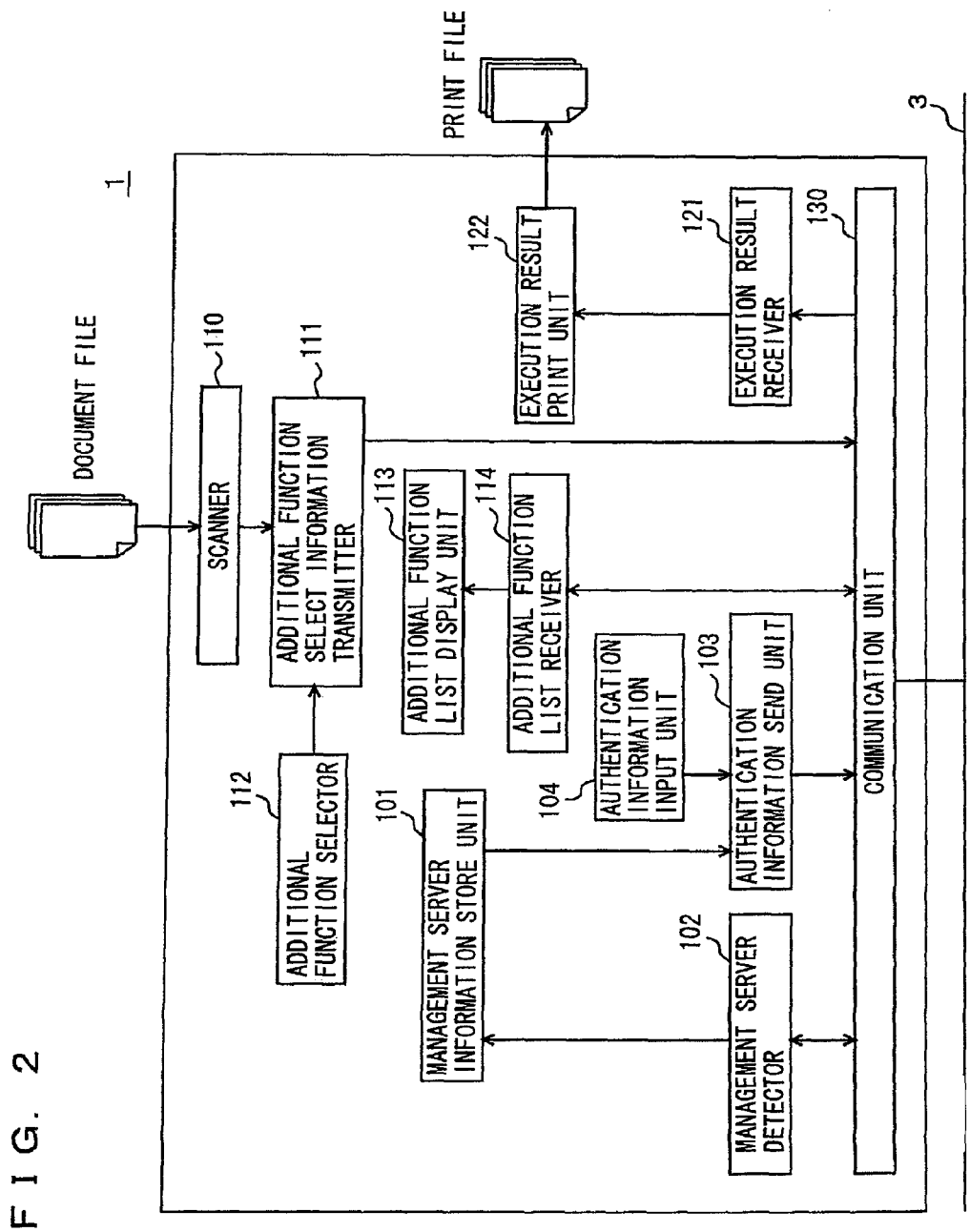
FIG. 2 is a functional block diagram showing function of MFP according to the present embodiment.

FIG. 2 is a functional block diagram showing the function of MFP according to the present embodiment. Referring to FIG. 2, MFP 1 includes a management server detector 102 detecting management server 2, a management server information store unit 101 storing information related to the detected management server 2, an authentication information input unit 104 accepting input of authentication information for authenticating a user, an authentication information send unit 103 transmitting authentication information to the detected management server, a communication unit 130 connecting MFP 1 to the network, an additional function list receiver 114 receiving an additional function list from management server 2, an additional function list display unit 113 displaying the received additional function list, an additional function selector 112 selecting the additional function desired by a user from the displayed additional function list, a scanner 110 for reading a document and outputting image data, an additional function select information transmitter 111 for transmitting the image data output from scanner 110 and the additional function selected by additional function selector 112 to management server 2, an execution result receiver 121 receiving the execution result of the additional function from management server 2, and an execution result print unit 122 forming an image of the received execution result.

Management server detector 102 sends a search request to network 3 through communication unit 130. While the search request is the one transmitted to management server 2, MFP 1 is not aware of management server 2 at the stage being connected to network 3. Therefore, the search request will be transmitted without a transmission party being specified, or transmitted to a predetermined transmission party. For example, it is transmitted as a broadcast. In the search request, for example, IP (internet protocol) address or MAC (media access control) address is included as information of location allocated to MFP 1 in network 3.

When receiving the search request through network 3, management server 2 transmits response information that includes information of location allocated to management server 2 in network 3, for example IP address or MAC address, to MFP 1 that has transmitted the search request. Management server detector 102 extracts the location information of management server 2 from the response information received from management server 2, and stores it in management server information store unit 101. Management server information store unit 101 is realized by a storage apparatus such as hard disc. Management server information store unit 101 may be realized by a semiconductor memory such as RAM, as long as it can store information. Additionally, when a plurality of management servers 2 are connected to network 3, they each transmit the response information. Accordingly, management server information store unit 101 stores the location information of the plurality of management servers 2.

Authentication information input unit 104 is an input apparatus accepting the input of authentication information for authenticating a user. The authentication information may includes, for example, an identification number (user ID) for identifying a user, and a secret number (password). Authentication information input unit 104 is realized by a keyboard or a touch panel provided to MFP 1. Further, the authentication information may includes, alternative to the identification number and the secret number, information that can identify the user such as fingerprints, iris, facial feature, voice print of a user. In such a case, authentication information input unit 104 is realized by an imaging apparatus, microphone or the like for inputting the authentication information.

Authentication information send unit 103 transmits the authentication information being input at authentication information input unit 104 to the location information stored in management server information store unit 101 through communication unit 130 and network 3. When the location information of a plurality of management servers 2 is stored in management server information store unit 101, it prompts the user to instruct which management server 2 should be selected, and transmits the authentication information to management server 2 specified by the instruction of the user.

Communication unit 130 is an interface for connecting management server 2 to network 3. For communication unit 130, an interface that corresponds to the connection mode between MFP 1 and management server 2 is employed.

Additional function list receiver 114 receives an additional function list from management server 2 that has transmitted the authentication information. The additional function list is the list defining a predetermined additional function for each user among a single or a plurality of additional function(s) executed by management server 2, and it is the information listing information for identifying additional functions, for example the number allocated to the additional functions or the names thereof. The additional function list will be detailed later.

Additional function list display unit 113 is a display apparatus for displaying the additional function list received at additional function list receiver 114. Additional function list display unit 113 may be, for example, a liquid crystal display apparatus or an organic EL (electro-luminescence) display panel.

Additional function selector 112 is an input apparatus for a user to select a desired additional function from the additional function list displayed on additional function list display unit 113. Additional function selector 112 is an input apparatus provided to MFP 1, such as a touch panel or a key board. MFP 1 employs a touch panel formed of a transparent member as the input apparatus, to arrange it so as to cover the display apparatus. MFP 1 displays a button on the display apparatus and detects the operation of a user pressing the displayed button. This allows the user to input various operations without using a switch button fixed on the input apparatus.

Scanner 110 is an image reading apparatus for reading a document and outputting image data. Scanner 110 may includes, for example, a photoelectric conversion element such as CCD (Charge Coupled Device), and optically reads the document and outputs the image data as electronic data.

Additional function select information transmitter 111 transmits the image data output from scanner 110 and select information including information for identifying the additional function selected by additional function selector 112, to management server 2. Though the example is described where the image data output from scanner 110 is transmitted, the image data is not limited thereto and it may be image data transmitted from user computer 4, or image data received with facsimile function.

Thus, when the image data and the information for identifying the selected additional function are transmitted to management server 2, management server 2 executes a process to the image data based on the selected additional function, and the execution result is returned to MFP 1.

Execution result receiver 121 receives the execution result of the additional function from management server 2. The execution result may be different depending on the selected additional function. When the selected additional function is related to an image process, the execution result is the transmitted image data being executed the image process. Further, when the selected additional function is a transmission process or a file management process, the execution result is state information showing that such a process has been executed normally, or not executed normally (an error).

Execution result print unit 122 is an image forming apparatus for printing out the received image data or state information.

Figure 3:
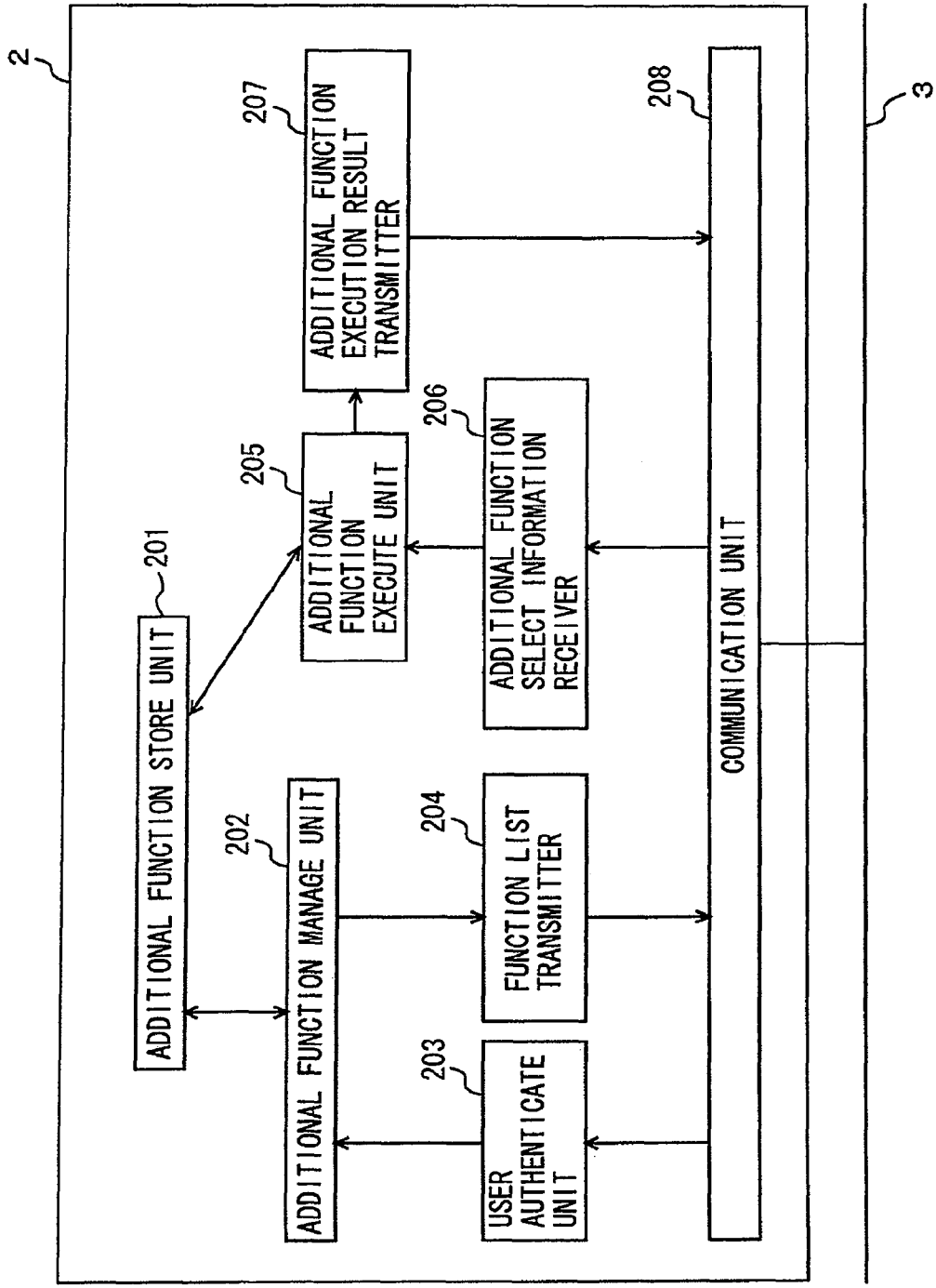
FIG. 3 is a functional block diagram showing function of a management server according to the present embodiment.

FIG. 3 is a functional block diagram showing the function of management server according to the present embodiment. Referring to FIG. 3, management server 2 includes a user authenticate unit 203 receiving authentication information from MFP 1 and executing authentication, an additional function manage unit 202 managing the additional function corresponding to each user, an additional function store unit 201 storing an additional function program for executing an additional function, an additional function select information receiver 206 receiving image data and select information for identifying the selected additional function from MFP 1, an additional function execute unit 205 executing the additional function specified by the select information, an additional function execution result transmitter 207 transmitting the result of the execution by additional function execute unit 205 to MFP 1, and communication unit 208 connecting management server 2 to the network.

User authenticate unit 203 receives authentication information from MFP 1. Then, it compares the received authentication information with authentication information that is pre-stored in a storage apparatus such as hard disc. The authentication information pre-stored in the storage apparatus of management server 2 is an identification number and a secret number, or fingerprints, iris, face feature, voice print of a user and the like. When the result of the authentication information comparison shows that the authentication information match, the user is determined to be the pre-registered user (a true user), and otherwise, the user is determined to be a user not pre-registered (a false user). When determined to be a false user upon the authentication result, then error information indicating as such is transmitted to MFP 1. Then, MFP 1 displays the received error information on the display apparatus. The user sees the error information and recognizes that he/she can not cause management server 2 to execute the additional function. On the other hand, when determined to be the true user, then identification information for identifying the user, for example, the identification number of the user is output to additional function manage unit 202.

Additional function manage unit 202 has an additional function per user table that defines an additional function predetermined for each user among a single or a plurality of additional function(s) executed by management server 2. The additional function per user table is pre-stored in a storage apparatus such as hard disc. The additional function per user table associates identification information of a user, information for identifying an additional function, an additional function program, and a parameter to be provided to the additional function program with one another. The additional function per user table will be detailed later. Receiving the identification information for identifying the user from user authenticate unit 203, additional function manage unit 202 uses the identification information to search through the additional function per user table. Then, it extracts information for identifying the additional function pre-registered for the user, and outputs it to function list transmitter 204.

Function list transmitter 204 transmits the information for identifying the additional function received from additional function manage unit 202, from communication unit 208 to MFP 1 through network 3.

Additional function store unit 201 stores an additional function program for executing an additional function. Additional function store unit 201 is a storage apparatus of management server 2. Additional function store unit 201 pre-stores application programs such as an e-mail transmission program, a file transfer program, a file management program, an image processing program.

Additional function select information receiver 206 receives the image data and the select information for identifying the selected additional function from MFP 1 through communication unit 208. Additional function execute unit 205 uses the select information received at additional function select information receiver 206 to obtain corresponding application program and the parameter for providing to the program from the additional function per user table included in additional function manage unit 202. Then, it reads and executes the corresponding application program stored in additional function store unit 201. The executed application program is provided with the obtained parameter. The results of the execution of the application program is output to additional function execution result transmitter 207.

Additional function execute result transmitter 207 receives the result of the execution of the application program from additional function execute unit 205, and transfers the result from communication unit 208 to MFP 1 through network 3.

FIG. 4 shows an exemplary additional function per user table. The additional function per user table is pre-stored in the hard disc of management server 2. Additional function per user table may be designed such that each user operates management server 2 to register an additional function, or the additional function per user table may be rewritten from user computer 4. Referring to the figure, the additional function per user table associates a user ID as identification information for identifying a user, an additional function number as information for identifying an additional function, a title, an application program name, and a parameter to be provided to the application program with one another. For example, for user ID "001", three additional functions having additional function numbers of "1", "2" and "3" are registered. The additional function having the additional function number of "1" is associated with the title of "mail transmission to Mr. A", the application program of "e-mail program", and the parameter of the e-mail address of Mr. A. It is noted that no parameter is associated with the additional function having the additional function number of "3", since the application program is "smoothing program".

As above, the additional function per user table defines an additional function associated with a user ID, and therefore the additional function registered for a user may be extracted from the user ID. For example, if a user defines the frequently used additional function in the additional function per user table in advance, then he/she can extract only a prescribed additional function from a plurality of additional functions. Thus, the selection of the additional functions is facilitated. Additionally, by designating the additional function number, only one additional function can be specified. Further, as the additional function number is associated with the application program and the parameter to be provided to that application program, by specifying the additional function number, the application program to be executed and the information (parameter) necessary for executing that application program can be specified. Accordingly, the additional function specific for the user, for example, the additional function for transmitting image data to a specific person can be defined.

Figures 5, 6:
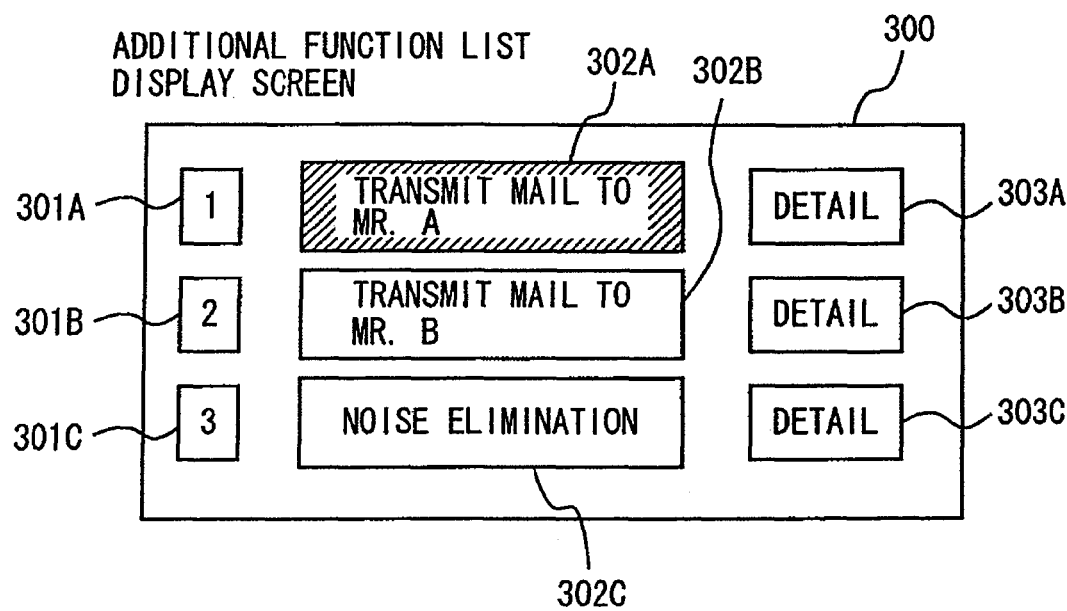
FIG. 5 shows an exemplary additional function list.
FIG. 6 shows an exemplary additional function list display screen.

FIG. 5 shows an exemplary additional function list. The figure shows the additional function list of user ID "001". The additional function list is generated by additional function manage unit 202 of management server 2 referring to the additional function per user list, and transmitted to MFP 1. Referring to the figure, the additional function list includes an additional function number and a title, which correspond to the additional function number and the title of the additional function per user list described with reference to FIG. 4, respectively. As the additional function list is created for each user, it only includes the additional function number and title for the additional functions registered in the additional function list for user ID "001", and does not include any information for other user ID. Accordingly, the figure only shows the additional function numbers of "1", "2" and "3", and the corresponding titles registered in the additional function per user list. It is noted that it may not include the title and instead it may include the application program and the parameter. In either cases, the additional function list is only required to include information that can identify the additional function registered in the additional function per user list for a user, and information for the user to determine what the additional function is. The additional function per user list may only include information with which an additional function can be identified (e.g., the additional function number), if a user can determine the additional function only with the information.

FIG. 6 shows an exemplary additional function list display screen. Additional function list display screen is a screen displayed by additional function list display unit 113 of MFP 1. Here, the additional function list display screen is shown that is displayed when the additional function list shown in FIG. 5 is received from management server 2. Referring to the figure, additional function list display screen 300 includes buttons 301A, 301B and 301C showing the additional function numbers, and areas 302A, 302B and 302C showing the titles corresponding to the additional function numbers, and detail display buttons 303A, 303B and 303C showing the text "detail". Accordingly, as additional function list display screen 300 shows additional function numbers and titles, the user can be informed of the additional functions that can be executed by management server 2.

Additionally, when the user presses areas 302A, 302B and 302C of the title being displayed, or designating with a pointing device or the like, the designated area will be highlighted. This designation corresponds to the selection of the additional function. In the figure, the highlighted region 302A is shown by hatching. Here, though the area 302A is exemplary designated, but the selection of the additional function is not limited to one and a plurality of areas may be designated. For example, all additional functions of additional function numbers "1", "2" and "3" may be selected. In this case, in management server 2, after a noise elimination process is executed to image data, the image data removed of noise may be transmitted to Mr. A and Mr. B through e-mail.

Further, in preparation for the case where the user can not determine the additional function only by the title display, detail display buttons 303A, 303B and 303C are displayed. Detail display buttons 303A, 303B and 303C correspond to areas 302A, 302B and 302C showing titles, respectively, and the selection of detail display buttons 303A, 303B and 303C means the selection of the title and the additional function number displayed in corresponding areas 302A, 302B and 302C. For example, when detail display button 303A is pressed, additional function number "1" is transmitted to management server 2, and in response, the name of the application program "e-mail program" and the e-mail address of Mr. A that is the parameter registered in the additional function per user list are downloaded to be displayed on another screen. It is noted that they may not be downloaded at this stage and may be downloaded with the additional function list.

Though it has been described that additional function list display screen 300 displays the additional function number, it may not be displayed if the user can determine the additional function by the title display. In this case, when the title is specified, then the corresponding additional function number is transmitted to management server 2 as select information.

Figure 7A:
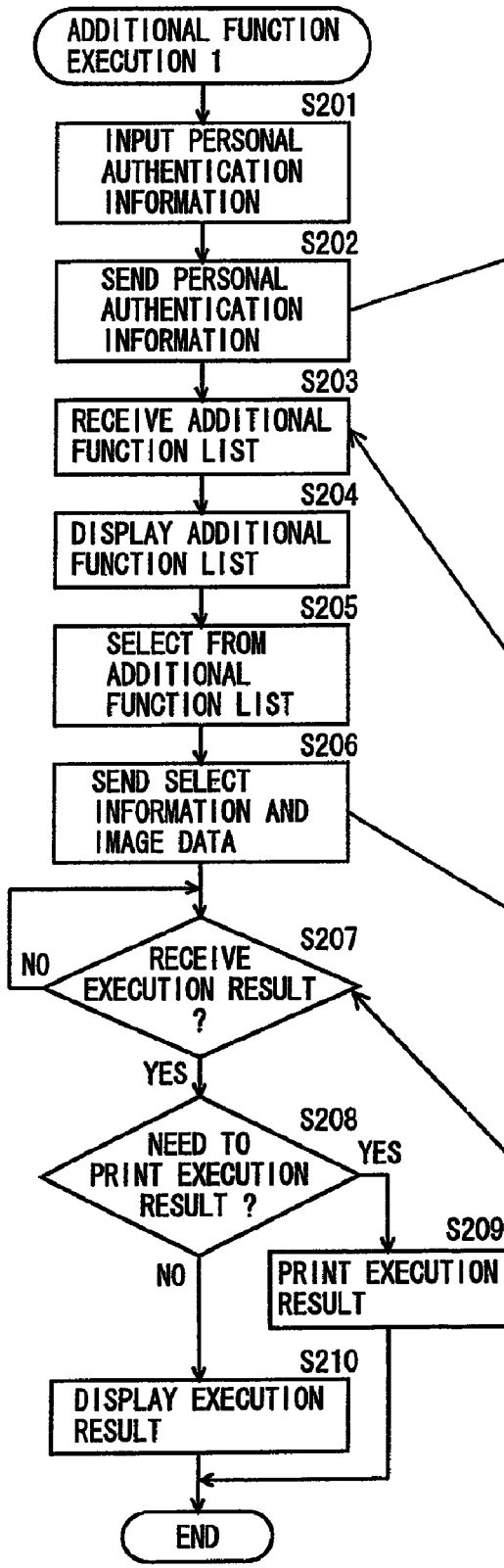
FIGS. 7A and 7B are flow charts showing the flow of an additional function executing process executed in the print system according to the present embodiment.
Figure 7B:
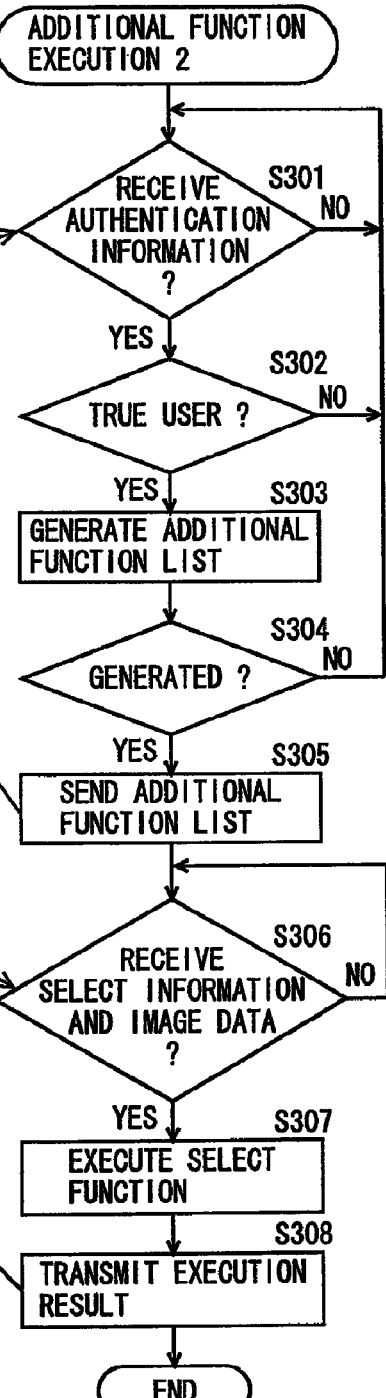

FIGS. 7A and 7B are flow charts showing the flow of the additional function executing process executed by the print system according to the present embodiment. FIG. 7A shows the flow of the process executed by MFP, while FIG. 7B shows the flow of the process executed by the management server. Referring to the figures, in the additional function executing process, when an input of authentication for authenticating a user is accepted (step S201), the input authentication information is transmitted to management server 2 (step S202). It is noted that when the location information of a plurality of management servers 2 is stored in information store unit 101, a user is prompted to instruct which management server 2 is to be selected. Then, the authentication information is transmitted to management server 2 specified by the instruction of the user.

Management server 2 is in a waiting state until receiving the authentication information from MFP 1 (NO at step S301), and goes to step S302 when receiving the authentication information. At step S302, user authentication is performed using the received authentication information. When the user is determined to be the true user based on the user authentication, the process goes to step S303, and when the user is determined to be a false user, then the process goes back to step S301. Note that when the user is determined to be a false user, then error information informing thereof is transmitted to MFP 1 before going back to step S301

As described above, the authentication information includes the identification information for discriminating the user from other person. Management server 2 uses this identification information for searching through the additional function per user table stored in the hard disc, to extract information for identifying the additional function pre-registered for the user, thereby generating the additional function list (step S303). The information for identifying the additional function herein is the additional function number and the title. Then, it is determined if the additional function list is generated or not (step S304). If it is generated, the process goes to step S305, and if not, the process goes back to step S301. Though it is not illustrated, when it is not generated, the error information informing that the additional function can not be executed is transmitted to MFP 1 before going back to step S301. When MFP 1 receives the error information, MFP 1 displays it on the display unit. When the additional function list is not generated corresponds to the case that the additional function for that user is not pre-registered in the additional function per user list. In the next step S305, management server 2 transmits the generated additional function list to MFP 1.

MFP 1 receives the additional function list from management server 2 (step S203). Then, the received additional function list is displayed on the display apparatus (step S204). Thus, additional function list display screen 300 shown in FIG. 6 will be displayed. Specifically, the additional function pre-registered to the user is displayed associated with the user authentication by the management server. Therefore, specifically when the MFP is shared by a plurality of users, each user can easily select his/her additional function of frequent use.

Then, the additional function is selected (step S205). The selection of the additional function is performed by the user specifying areas 302A, 302B and 302C displayed on additional function list display screen 300. Here, none of areas 302A, 302B and 302C may be specified, i.e., none of the additional functions may be selected. Then, by the user pressing the start button of the operation panel provided to MFP 1, scanner 110 initiates reading the document.

When scanner 110 finishes reading the document, image data output from scanner 110 and select information for identifying the additional function selected at step S205 are transmitted to management server 2 (step S206). Though the example has been described where the image data output from scanner 110 is transmitted, the image data is not limited thereto, and it may be image data transmitted from user computer 4, or image data received by the facsimile function. In such a case, these image data are pre-stored in the hard disc or the like of MFP 1, and after the user specifying the image data through the operation of the input unit, the start button is pressed.

Management server 2 is in a waiting state until receiving the image data and the select information (NO at step S306). When it receives them (YES at step S306), then the process based on the additional function specified by the select information to the received image data is executed (step S307). After the execution of the process, the execution result of the process is transmitted to MFP 1 (step S308).

MFP 1 is in a waiting state until receiving the execution result of the additional function from management server 2 (NO at step S207). When MFP 1 receives it (YES at step S207), the process goes to step S208. At step S208, it is determined if printing of the execution result is necessary or not. When it is necessary, then the process goes to step S209, and when not, the process goes to step S210. The necessity can be determined as follows, for example. When the selected additional function is an image process (noise elimination in the present embodiment), the execution result is the image data being executed the image process. On the other hand, when the selected additional function is a transmission process or a file management process, then the execution result is if the process has been executed normally or not. Accordingly, when the selected additional function is the image process, it is determined that printing of the image data that is the execution result is necessary. When the selected additional function is the transmission process or the file management process, then it is determined the printing of the execution result is not necessary. As another method, the necessity of printing may be instructed by the user. In this case, when the execution result is received, a message inquiring if it should be printed or not is displayed on the display unit, and upon the instruction from the user, it is determined that it is necessary to print it.

At step S209, the execution result is printed. At step S210, the execution result is displayed.

Figure 8A:
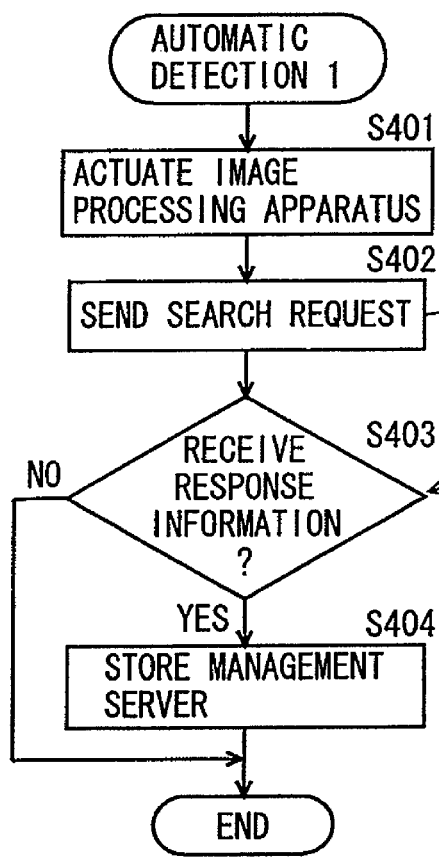
FIGS. 8A and 8B are flow charts showing the flow of a management server detecting process executed in the print system according to the present embodiment.
Figure 8B:
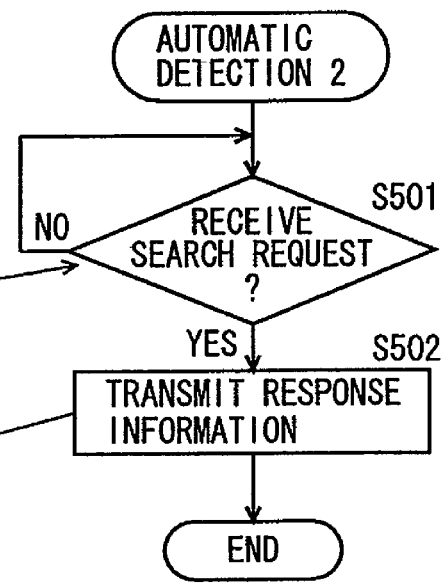

FIGS. 8A and 8B are flow charts showing the flow of a management server detecting process executed by the print system according to the present embodiment. FIG. 8A shows the flow of the process executed by MFP, while FIG. 8B shows the flow of the process executed by the management server. Referring to the figures, when MFP 1 is actuated (step S401), it sends a search request to network 3 (step S402). The search request is received at all management servers 2 connected to network 3 (step S501). When management server 2 accepts the search request, it sends response information including information of the location allocated to management server 2 in network 3 to MFP 1 (step S502).

When MFP 1 receives the response information from management server 2 at step S403, the process goes to step S404, and if it does not receive the response information, then the process is terminated. At step S404, the received location information of management server 2 is stored in the storage apparatus. When a plurality of management servers 2 are connected to network 3, then each of the plurality of management servers 2 sends response information, and the storage apparatus of MFP 1 stores the location information of the plurality of management servers 2.

As above, in print system 10 according to the present embodiment, the process content (additional function) that is pre-registered for a user is transmitted to MFP 1 as an additional function list associated with an authentication of the user by management server 2 and displayed. Accordingly, when a plurality of users share MFP 1, each of the user can easily select his/her frequently used process content (additional function), i.e., the operability is improved.

Further, when the additional function is specified from the additional function list, MFP 1 transmits the specified additional function and image data to management server 2, whereby the user can cause the management server 2 to execute the desired additional function.

Still further, as the additional function per user table is stored in the management server, the additional function can be executed by management server 2 from any of MFP 1 connected to network 3.

Still further, as the additional function per user table is stored in the management server, the same additional function can be displayed to any of MFP 1 connected to network 3.

Still further, when a plurality of management servers are connected to network 3, one of them can be selected. Therefore, the desired additional function can be executed even when the plurality of servers execute additional functions.

Still further, as management server 2 executes the transmission process, the file management processing or the like, the transmission of image data of a document read by MFP or the like may be facilitated. Thus, the storage thereof as a file is facilitated.

Still further, as the image process is executed by management server 2, the image process that can not be executed by MFP 1 may be executed by management server 2. Specifically, when image processing program is updated, it is only need to install the updated image processing program in management server 2. The image processing program of MFP is not necessarily updated. It is effective when there are plurality of MFP 1.

Still further, the processed image data is received from the management server and the received processed image data is output. Thus, as the processes that can not be executed by MFP is executed by management server 2 and then output, management server 2 is efficiently used and the quality of the output image can be improved.

It is noted that though MFP has been shown as an image processing apparatus in the present embodiment by way of illustration, the image processing apparatus of the present invention is not limited to MFP. For example, it may be a digital copying machine or the like that does not have the facsimile function.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus capable of communicating with a management server, comprising:
   an identification information accept unit configured to accept identification information for identifying a user;
   a receiver configured to receive from said management server data identifying one or more functions that are associated with said user identified by said identification information, from among a plurality of functions that can be executed by said management server;
   a display unit configured to display a screen including one or more icons corresponding to said one or more functions based on said received data;
   a selection accept unit configured to accept a selection of at least one icon from among said one or more icons displayed on said screen; and
   a transmitter configured to transmit to said management server information identifying at least one selected function corresponding to said selection of at least one icon and an image data to be processed by said selected function.

2. The image processing apparatus according to claim 1, wherein
   said display unit displays the one or more icons with information indicating a function corresponding to each icon.

3. The image processing apparatus according to claim 1, wherein
   said display unit displays a detailed information describing a function corresponding to each icon.

4. The image processing apparatus according to claim 3, wherein
   said receiver receives said detailed information sent from the management server in response to a request by said user.

5. The image processing apparatus according to claim 3, wherein
   said receiver receives said detailed information with said data identifying one or more functions that are associated with said user identified by said identification information.

6. The image processing apparatus according to claim 1, wherein
   said image processing apparatus is configured to communicate with a plurality of management servers, and
   said image processing apparatus further comprises a second transmitter configured to transmit said accepted identification information to a management server selected from the plurality of management servers.

7. The image processing apparatus according to claim 6, comprising a detector configured to detect said plurality of management servers in a network.

8. The image processing apparatus according to claim 7, wherein
   said detector is configured to send a search request to the network for detecting the plurality of management servers in the network, and receives a response to the search request.

9. The image processing apparatus according to claim 1, wherein
said one or more functions include at least one of transmission processing to transmit said image data to an outside apparatus, image processing to process said image data, and record processing to record said image data on a recording medium.

10. The image processing apparatus according to claim 9, wherein
said image processing includes at least one of tilt correction processing, noise elimination processing, color matching processing, smoothing processing, and direction correction processing in which direction of an image is determined and the image is rotated for correction.

11. The image processing apparatus according to claim 1, further comprising an output unit wherein
said one or more functions include image processing to process said image data,
said receiver receives said image data on which said image processing has been executed by said management server, and
said output unit outputs said received image data.

12. The image processing apparatus according to claim 11, wherein
said output unit comprises a print unit configured to print an image based on said image data.

13. The image processing apparatus according to claim 1, further comprising:
an input unit configured to input an image data, and
a key for instructing said input unit to execute inputting of said image data, wherein
said transmitter transmits said image data with the information identifying at least one selected function to said management server, when said key for instructing said input unit instructs the input unit to execute inputting of said image data after said selection accept unit accepts the selection of at least one icon.

14. The image processing apparatus according to claim 1, wherein
said receiver receives a result of execution of said at least one selected function from said management server.

15. The image processing apparatus according to claim 1, further comprising an identification transmitter configured to transmit the accepted identification information to the management server.

16. A method of communicating with a management server utilizing an image processing apparatus, the method comprising:
accepting identification information for identifying a user at said image processing apparatus;
receiving from said management server data identifying one or more functions that are associated with said user identified by said identification information, from among a plurality of functions that can be executed by said management server, at said image processing apparatus;
displaying a screen including one or more icons corresponding to said one or more functions based on said received data at said image processing apparatus;
accepting a selection of at least one icon from among said one or more icons displayed on said screen at said image processing apparatus; and
transmitting from said image processing apparatus to said management server information identifying at least one selected function corresponding to said selection of at least one icon and an image data to be processed by said selected function.

17. A non transitory recording medium having stored thereon instructions to execute processing, the processing comprising:
accepting identification information for identifying a user at said image processing apparatus;
receiving from said management server data identifying one or more functions that are associated with said user identified by said identification information, from among a plurality of functions that can be executed by said management server, at said image processing apparatus;
displaying a screen including one or more icons corresponding to said one or more functions based on said received data at said image processing apparatus;
accepting a selection of at least one icon from among said one or more icons displayed on said screen at said image processing apparatus; and
transmitting from said image processing apparatus to said management server information identifying at least one selected function corresponding to said selection of at least one icon and an image data to be processed by said selected function.

* * * * *